US010194697B2

(12) United States Patent
Fernando et al.

(10) Patent No.: US 10,194,697 B2
(45) Date of Patent: *Feb. 5, 2019

(54) ELECTRICALLY HEATED SMOKING SYSTEM

(71) Applicant: PHILIP MORRIS PRODUCTS S.A., Neuchatel (CH)

(72) Inventors: Felix Fernando, Berkshire (GB); Marc-Robert Chemla, Aubonne (CH); Fredrik Stahle, Vevey (CH)

(73) Assignee: Philip Morris Products S.A., Neuchatel (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/432,459

(22) Filed: Feb. 14, 2017

(65) Prior Publication Data

US 2017/0150758 A1 Jun. 1, 2017

Related U.S. Application Data

(63) Continuation of application No. 13/988,056, filed as application No. PCT/EP2011/005829 on Nov. 18, 2011, now Pat. No. 9,603,388.

(30) Foreign Application Priority Data

Nov. 19, 2010 (EP) .................................... 10251966

(51) Int. Cl.
*A24F 47/00* (2006.01)
*H02J 7/00* (2006.01)
(Continued)

(52) U.S. Cl.
CPC ....... *A24F 47/008* (2013.01); *H01M 10/0525* (2013.01); *H01M 10/44* (2013.01);
(Continued)

(58) Field of Classification Search
None
See application file for complete search history.

(56) References Cited

U.S. PATENT DOCUMENTS

| 4,714,082 A | 12/1987 | Banerjee et al. |
| 5,144,962 A * | 9/1992 | Counts ................... A24F 47/008 |
| | | 128/200.14 |

(Continued)

FOREIGN PATENT DOCUMENTS

| CN | 2789614 Y | 6/2006 |
| CN | 201079011 Y | 7/2008 |

(Continued)

OTHER PUBLICATIONS

English Translation of 2$^{nd}$ Office Action dated Jun. 3, 2015, in Application No. 201180062601X (12 pages).

(Continued)

*Primary Examiner* — Dennis R Cordray
(74) *Attorney, Agent, or Firm* — Oblon, McClelland, Maier & Neustadt, L.L.P.

(57) ABSTRACT

An electrically heated smoking system is provided, including a secondary unit configured to receive a smoking article having an aerosol-forming substrate. The secondary unit includes at least one heating element, an interface configured to connect to a primary power supply, a secondary power supply, and secondary circuitry. The secondary circuitry is configured to control supply of electrical power from the secondary supply to the heating element (a) in a pre-heating mode, during which a substrate temperature is increased to an operating temperature, and (b) in a smoking mode, during which a substrate temperature is maintained at substantially the operating temperature; and to control charging of the secondary supply by the primary supply in a charging mode, to have sufficient charge to increase a substrate temperature to the operating temperature in the pre-heating mode and to (Continued)

maintain the substrate temperature at substantially the operating temperature during the smoking mode.

11 Claims, 7 Drawing Sheets

(51) Int. Cl.
 *H05B 1/02* (2006.01)
 *H01M 10/0525* (2010.01)
 *H01M 10/44* (2006.01)
(52) U.S. Cl.
 CPC ............ *H02J 7/007* (2013.01); *H02J 7/0068* (2013.01); *H05B 1/0244* (2013.01); *H01M 2220/30* (2013.01)

(56) References Cited

U.S. PATENT DOCUMENTS

| | | | |
|---|---|---|---|
| 5,692,525 | A | 12/1997 | Counts et al. |
| 2009/0283103 | A1 | 11/2009 | Nielsen et al. |
| 2010/0313901 | A1* | 12/2010 | Fernando ............ A24F 47/008 131/330 |

FOREIGN PATENT DOCUMENTS

| | | |
|---|---|---|
| CN | 101795587 A | 8/2010 |
| EP | 1989946 | 11/2008 |
| EP | 2022349 | 2/2009 |
| EP | 2 047 880 A1 | 4/2009 |
| EP | 2110034 | 10/2009 |
| JP | 3-232481 A | 10/1991 |
| JP | 3160951 B2 | 4/2001 |
| JP | 2009-509521 A | 3/2009 |
| JP | 2010-526553 A | 8/2010 |
| KR | 10-0178388 B1 | 2/1999 |
| KR | 10-2010-0021595 A | 2/2010 |
| KR | 20-0448273 | 3/2010 |
| WO | WO 94/18860 A1 | 9/1994 |
| WO | WO 2007/039794 A2 | 4/2007 |
| WO | 2007098337 | 8/2007 |
| WO | WO 2008/015918 A1 | 2/2008 |
| WO | WO 2008/138650 A1 | 11/2008 |

OTHER PUBLICATIONS

International Search Report dated Apr. 3, 2013 in International Application No. PCT/EP2011/005829.
Japanese Office Action dated May 25, 2016 in Patent Application No. 2013-539170 (English translation only).
Combined Chinese Office Action and Search Report dated Nov. 3, 2014 in Patent Application No. 201180062601.X (with English language translation).
Office Action dated Aug. 10, 2015 in Japanese Patent Application No. 2013-539170 (with English language translation).
Office Action dated Aug. 28, 2017 in Japanese Patent Application No. 2016-189533 (submitting English translation only).
Office Action dated Dec. 27, 2017 in corresponding Korean Patent Application No. 10-2016-7033900 (English Translation only), citing documents AO, AP and AQ therein, 5 pages.
Office Action dated Jul. 26, 2018 in corresponding Korean Patent Application No. 10-2016-7033900 (English Translation only), citing documents AO, AP and AQ therein, 5 pages.

* cited by examiner

ELECTRICALLY HEATED SMOKING SYSTEM

CROSS-REFERENCE TO RELATED APPLICATIONS

This application is a continuation application of and claims the benefit of priority under U.S.C. § 120 from U.S. Ser. No. 13/988,056, filed May 17, 2013, which is a U.S. National Stage application of PCT/EP2011/005829, filed Nov. 18, 2011 and claims the benefit of priority under 35 U.S.C. § 119 from EP 10251966.7, filed Nov. 19, 2010, the entire contents of each of which are incorporated herein by reference.

The present invention relates to an electrically heated smoking system having a unit for receiving a smoking article, wherein the unit includes a secondary power supply and the unit is connectable to a primary power supply.

A number of prior art documents disclose electrically operated smoking systems, having a number of advantages. One advantage is that they significantly reduce sidestream smoke, while permitting the smoker to selectively activate the smoking system during the smoking experience. The electrically operated smoking systems of the prior art typically include a housing for receiving a smoking article, heating elements to generate an aerosol, a power source and the necessary electronic circuitry. The circuitry may be activated manually or by insertion of a cigarette into the housing, and may limit operation of the heating elements to a pre-defined time period.

Some of the electrically operated smoking systems of the prior art have disadvantages, however. It would be advantageous if the devices could be made smaller and more convenient for the user, so that the size is closer to that of a lit-end cigarette and the device can be held between the fingers of a user in a similar way to a lit-end cigarette. It is therefore an object of the invention to provide an improved electrically heated smoking system.

According to a first aspect of the invention, there is provided an electrically heated smoking system comprising a secondary unit capable of receiving a smoking article having an aerosol-forming substrate, the secondary unit comprising: at least one heating element; an interface for connection to a primary power supply; a secondary power supply for supplying electrical power to the at least one heating element; and secondary circuitry arranged to control supply of electrical power from the secondary power supply to the at least one heating element in a pre-heating mode, during which the temperature of the aerosol-forming substrate is increased to an operating temperature, to control supply of electrical power from the secondary power supply to the at least one heating element in a smoking mode, during which the temperature of the aerosol-forming substrate is maintained at substantially the operating temperature, and to control charging of the secondary power supply by the primary power supply, in a charging mode, so that the secondary power supply has sufficient charge to increase the temperature of the aerosol-forming substrate to the operating temperature in the pre-heating mode and to maintain the temperature of the aerosol-forming substrate at substantially the operating temperature during the smoking mode.

The secondary unit is designed to receive a smoking article and be held by a user during the smoking experience. The power supply in the secondary unit heats up the aerosol-forming substrate to operating temperature before smoking begins. The power supply in the secondary unit also maintains the temperature of the aerosol-forming substrate during the smoking experience. The secondary unit connects to a primary power supply. The primary power supply is used to charge the secondary power supply during a charging mode when the secondary unit is not in use. The primary power supply may form part of a primary unit, which is separate from the secondary unit.

By providing a secondary power supply in the secondary unit and a separate, external primary power supply (that is, by dividing the power supply for the smoking system between a primary power supply and a secondary power supply in the secondary unit), the size of the secondary unit can be reduced. The secondary unit is preferably only slightly larger than the smoking article. The secondary unit is preferably of a similar size to or slightly larger than a lit-end cigarette. Thus, the secondary unit can be held between the user's fingers in a similar way to a lit-end cigarette.

Preferably, the secondary circuitry is arranged to determine whether the secondary power supply has sufficient charge to increase the temperature of the aerosol-forming substrate to the operating temperature in the pre-heating mode and to maintain the temperature of the aerosol-forming substrate at substantially the operating temperature during the smoking mode, based on a calculation of an estimate of electrical power required for both the pre-heating mode and the smoking mode.

The calculation may be based on one or more of: a pre-specified number of puffs to be taken by a user during the smoking mode; the electrical power required for the pre-heating mode; and consumer-specific information relating to the smoking mode.

The calculation may be performed by the secondary circuitry. The pre-specified number of puffs may be approximately equal to the typical number of puffs to be taken by a user smoking a lit-end cigarette. The consumer-specific information may include gathered and stored power consumption information. The power consumption information may depend on the actual consumer, for example, the strength and length of consumer puffs, in order to allow for the pre-specified number of puffs. The power consumption information is preferably stored in the secondary unit. This may be advantageous since the secondary circuitry is arranged to control supply of power during the charging mode. The power consumption information may alternatively be stored in the primary unit. The power consumption information may be transferred to the primary unit from the secondary unit. The interface for connection to the primary power supply allows power to be supplied from the primary power supply to the secondary unit during the charging mode. The interface also allows the secondary circuitry to control supply of power during the charging mode. For those purposes, the connection may be a wired connection such as a Universal Serial Bus (USB) connection or coaxial cable. A USB connection is advantageous because a USB communications link provides bi-directional communication and also a power link (usually 5 V).

The interface may alternatively or additionally facilitate other functionality and features for the smoking system. For that purpose, the connection may be a wired connection (such as a USB connection) or a wireless connection (such as a Bluetooth connection). Preferably, the interface facilitates bi-directional communication between the secondary unit and an intelligent device or host that has its own computing capability and is capable of acting as the primary power supply. This may allow data to be downloaded from the intelligent device or host to the secondary unit and data to be uploaded from the secondary unit to the intelligent device or host.

Preferably, the connection operates under an interface standard. An interface standard is a standard that describes one or more functional characteristics, such as code conversion, line assignments, or protocol compliance, or physical characteristics, such as electrical, mechanical, or optical characteristics, necessary to allow the exchange of information between two or more systems or pieces of equipment. Examples of suitable interface standards for the communications link include, but are not limited to, the Recommended Standard 232 (RS-232) family of standards; USB; Bluetooth; FireWire (a brand name of Apple, Inc for their IEEE 1394 interface), IrDA (Infrared Data Association—a communications standard for the short-range exchange of data by Infrared light); Zigbee (a specification based on the IEEE 802.15.4 standard for wireless personal area networks) and other Wi-Fi standards.

Preferably, the secondary circuitry is programmable. The secondary circuitry may be programmable such that the secondary unit can be personalised to an individual user's smoking behaviour. For example, the secondary circuitry may be programmable to adjust the electrical power supplied to the at least one heating element during the smoking mode based on the particular user using the secondary unit, the particular smoking article contained in the secondary unit or both.

The primary power supply may be located in an external intelligent device or host such as a computer. The host may be a personal computer. The personal computer may be a desktop computer. The personal computer may be a laptop computer or a notebook computer. The personal computer may be a tablet computer such as a Personal Digital Assistant (PDA), a Personal Information Device (PID), a Portable Media Player (PMP, such as an Apple, Inc iPod®) or a Portable Video Player (PVP). The host may be a mobile cellular telephone.

The primary power supply may simply be an external power source such as the commercial power supply (also known as mains power, household power, domestic power, wall power or grid power). That is to say, the interface on the secondary unit may be connectable to a wall socket. The primary power supply may be an in-vehicle power supply, for example, in a car. That is to say, the interface on the secondary unit may be connectable to a charging socket in a vehicle.

In a preferred embodiment, the electrically heated smoking system further comprises a primary unit comprising the primary power supply and primary circuitry. In that embodiment, by providing a primary power supply in the primary unit and a secondary power supply in the secondary unit (that is, by dividing the power supply between the primary and secondary units), the size of the secondary unit can be reduced. In addition, in some embodiments, all the components required for the smoking experience can be contained in a single unit of a size and shape similar to a pack of lit-end cigarettes.

In the embodiment including a primary unit, the calculation of an estimate of electrical power required for both the pre-heating mode and the smoking mode may be performed by the primary circuitry. In the embodiment including a primary unit, the interface on the secondary unit may be for connection to the primary unit only, or to the primary unit and another external unit.

In the embodiment including a primary unit, supply of electrical power from the secondary power supply to the at least one heating element, during the pre-heating mode, may be partially controlled by the primary circuitry in the primary unit in addition to the secondary circuitry in the secondary unit.

In one embodiment, the primary unit comprises an interface for connection to an external power supply for supplying electrical power to the primary power supply. The interface in the primary unit may allow power to be supplied from an external power supply to the primary power supply during the pre-heating mode, during the charging mode, during the smoking mode, when the smoking system is not in use or at any combination of those times. For that purpose, the connection may be a wired connection such as a USB connection or coaxial cable. The external power supply may simply be a power source such as the commercial power supply.

Preferably, the primary circuitry is programmable. If the primary power supply is chargeable by an external power supply, preferably, the primary circuitry controls charging of the primary power supply. If the primary unit includes an interface for connection to an external host, preferably, the primary circuitry controls communication between the primary unit and the external host.

In an embodiment which includes a primary unit, the electrically heated smoking system comprises one, and only one, secondary unit. Such an embodiment is advantageous as it is designed for a single user. In a preferred embodiment, the primary unit comprises storage means for the single secondary unit to form a single compact unit. Preferably, the single compact unit is easily transportable by the user.

In an alternative embodiment which includes a primary unit, the electrically heated smoking system comprises two, and only two, secondary units. Such an embodiment is advantageous as it is designed to be shared by two users. In a preferred embodiment, the primary unit comprises storage means for the two secondary units to form a single compact unit. In a preferred embodiment, the primary unit comprises a first module for receiving a first secondary unit and a second module for receiving a second secondary unit. Each module may include some or all of the functionality of the primary unit.

In an alternative embodiment which includes a primary unit, the electrically heated smoking system comprises more than two secondary units. Such an embodiment is advantageous as it is designed to be shared by a plurality of users. In one embodiment, the primary unit comprises storage means for the plurality of secondary units. In another embodiment, the primary unit includes a plurality of docking ports to receive respective secondary units for connection during the charging mode and, optionally, during the pre-heating mode.

When the electrically heated smoking system comprises two or more secondary units, the primary unit may include a plurality of connectable modules, each module including a docking port for a respective secondary unit. This allows two or more users to form a single primary unit comprising a nest or chain of modules.

Preferably, the primary unit includes storage means for one or more secondary units. This is advantageous since the primary unit and the secondary unit, when not in use, may form a single compact system, which may be easily transportable. The single compact system may be of a size and shape similar to a pack of lit-end cigarettes. In one embodiment, each secondary unit is removably attachable to a side of the primary unit. In another embodiment, each secondary unit is receivable in a respective docking cavity in the primary unit. The secondary units may be storable in the storage means when a smoking article is contained in the secondary unit. Alternatively, the secondary units may be storable in the storage means when a smoking article is not contained in the secondary unit. The storage means may also provide means for connecting the primary unit and the secondary unit to charge the secondary power supply.

Preferably, the primary unit includes storage means for at least one smoking article. The storage means may include storage for used smoking articles, unused smoking articles or both. This is advantageous since the primary unit and secondary unit together provide all the components required for the smoking mode. In an embodiment in which the one or more secondary units are storable in the storage means and in which the primary unit includes storage for at least one smoking article, all the components required for the smoking experience can be contained in a single compact system. The single compact system may be of a size and shape similar to a pack of lit-end cigarettes. Additionally, or alternatively, the secondary unit may be capable of storing a smoking article when not in use. For the avoidance of doubt, the term "storage means" is used here to indicate storage for one or more secondary units, storage for one or more smoking articles, or storage for both secondary units and smoking articles.

In a preferred embodiment, the primary unit comprises a base portion and a lid portion connected to the base portion, the lid portion covering some or all of the base portion when closed. The lid portion may be connected to the base portion by any suitable connection. For example, the lid portion may be connected to the base portion by a hinge. Alternatively, the lid portion may be a sliding lid. For example, the primary unit may comprise a shell portion and a slide portion arranged to slide relative to the shell portion. Alternatively, the lid portion may friction fit with the base portion. Alternatively, the lid portion may screw fit with the base portion.

In that embodiment, preferably the base portion of the primary unit comprises storage space for a plurality of smoking articles and storage space for at least one secondary unit. In that case, the lid portion may be closable on the base portion when the secondary unit is stored in the base portion. Even more preferably, the lid portion may be closable on the base portion when the secondary unit is stored in the base portion and a smoking article is contained in the secondary unit. In a preferred embodiment, when smoking articles and a secondary unit are stored in the base portion and the lid portion is closed, the smoking system has a size and shape similar to that of a pack of lit-end cigarettes.

The primary unit may include a display (for example a digital display) indicating information to the user. For example, the display may indicate smoking article usage, energy usage or other information. The display may further indicate when the secondary power supply has sufficient charge during the charging mode.

Supply of electrical power from the secondary power supply to the at least one heating element, during the smoking mode, is controlled by the secondary circuitry. During the smoking mode, the secondary circuitry may monitor the time elapsed of the smoking mode. The secondary unit may include a display (for example a digital display) indicating information to the user. For example, the display may indicate the time elapsed, the number of puffs taken, the number of puffs still remaining or other information. The secondary circuitry is preferably arranged to provide an output signal when the time elapsed is equal to a pre-determined period of time. Alternatively or in addition, the secondary circuitry may monitor the time elapsed between puffs during the smoking mode and provide an output signal when the time elapsed is equal to a pre-determined period of time, which is shorter than the pre-determined period of time for the smoking mode. Further, during the smoking mode, the secondary circuitry may monitor the number of puffs taken by a user. The secondary circuitry is preferably arranged to provide an output signal when the number of puffs taken is equal to a pre-determined number of puffs. Thus, there are three possible modes of operation. In a first mode, the smoking mode has a pre-determined maximum period of time. In a second mode, the smoking mode has a pre-determined maximum number of puffs. In a third mode, the smoking mode has a pre-determined maximum period of time between puffs.

As already mentioned, the secondary unit preferably has a diameter that is only slightly larger than the diameter of the smoking article. Additionally, the length of the secondary unit may be similar to the length of a lit-end cigarette (for example, a cigarette having a length of between approximately 30 mm and approximately 150 mm and more preferably between approximately 70 mm and approximately 128 mm), or the secondary unit may be longer or shorter. In one embodiment, the smoking article used has a diameter and length that is smaller than a standard lit-end cigarette (for example, a cigarette with a diameter of approximately 7.9 mm and a length of approximately 85 mm) which allows the secondary unit to be of a similar size to a lit-end cigarette. This allows a user to hold the secondary unit between the user's fingers in a similar way to a lit-end cigarette.

Preferably, the secondary unit is insulated. This reduces heat loss from the secondary unit and allows the aerosol-forming substrate to be maintained at substantially the operating temperature for the desired period of time. The secondary unit may comprise a base portion capable of receiving the smoking article and a cap portion for enclosing the smoking article or closing the base portion.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol. The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Optionally, the solid substrate may contain additional tobacco or non-tobacco volatile flavour compounds, to be released upon heating of the substrate. Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavour delivery during use. Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The aerosol-forming substrate may be a liquid substrate and the smoking article may comprise means for retaining the liquid substrate. The aerosol-forming substrate may alternatively be any other sort of substrate, for example, a gas substrate, or any combination of the various types of substrate.

According to another aspect of the invention, there is provided a primary unit for the electrically heated smoking system of the first aspect of the invention, the primary unit comprising a primary power supply and primary circuitry.

According to another aspect of the invention, there is provided a method of operating an electrically heated smoking system comprising a secondary unit capable of receiving a smoking article having an aerosol-forming substrate, the secondary unit comprising at least one heating element, an interface for connection to a primary power supply, a secondary power supply, and secondary circuitry, the method comprising the steps of: during a pre-heating mode, connecting the at least one heating element to the secondary power supply, such that the secondary power supply supplies electrical power to the at least one heating element to increase the temperature of the aerosol-forming substrate to an operating temperature; during a smoking mode, connecting the at least one heating element to the secondary power supply, such that the secondary power supply supplies electrical power to the at least one heating element to maintain the temperature of the aerosol-forming substrate at substantially the operating temperature; and during a charging mode, charging the secondary power supply by the primary power supply, such that the secondary power supply has sufficient charge to increase the temperature of the aerosol-forming substrate to the operating temperature in the pre-heating mode and to maintain the temperature of the aerosol-forming substrate at substantially the operating temperature during the smoking mode. The method may further comprise the step of, during the charging mode, determining whether the secondary power supply has sufficient charge to increase the temperature of the aerosol-forming substrate to the operating temperature in the pre-heating mode and to maintain the temperature of the aerosol-forming substrate at substantially the operating temperature during the smoking mode, based on a calculation of an estimate of electrical power required for both the pre-heating mode and the smoking mode.

The calculation may be based on one or more of: a pre-specified number of puffs to be taken by a user during the smoking mode; the electrical power required for the pre-heating mode; and consumer-specific information relating to the smoking mode. The calculation may be performed by the secondary circuitry.

The method may further comprise the step of, during the charging mode, signalling when the secondary power supply has sufficient charge to increase the temperature of the aerosol-forming substrate to the operating temperature in the pre-heating mode and to maintain the temperature of the aerosol-forming substrate at substantially the operating temperature during the smoking mode.

Features described in relation to one aspect of the invention may also be applicable to another aspect of the invention.

The invention will be further described, by way of example only, with reference to the accompanying drawings, of which.

In general, the invention does not require the primary unit, in which case the secondary unit may be a standalone unit connectable to an existing external power supply. However, as discussed above, in one embodiment, the electrically heated smoking system of the invention comprises a primary unit and one or more secondary units capable of receiving a smoking article. The primary unit includes a primary power supply and electronic circuitry. The secondary unit includes a secondary power supply, electronic circuitry and at least one heating element. The primary power supply in the primary unit is used for charging the secondary power supply in the secondary unit, in the charging mode. The secondary power supply in the secondary unit is used to raise the temperature of the aerosol-forming substrate to an operating temperature, in the pre-heating mode, and to maintain the temperature of the substrate during the smoking experience, in the smoking mode. The required operating temperature will depend upon the particular aerosol-forming substrate in the smoking article. The operating temperature is controlled by the secondary power supply, the number and type of heating elements and the structure of the secondary unit. By dividing the power supply between the primary unit and the secondary unit, the size of the secondary unit can be reduced, such that it is only slightly larger than the smoking article. In addition, in some embodiments, all the components required for the smoking experience can be contained in a single unit of a size and shape similar to a pack of lit-end cigarettes. Various embodiments will now be described and features described in relation to any embodiment may equally be applicable to any of the other embodiments.

Figure 1A:
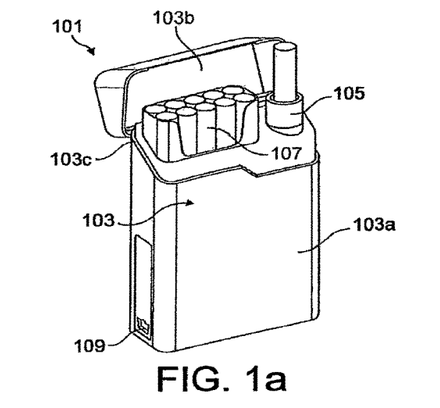
FIGS. 1a, 1b, 1c and 1d show four versions of a first embodiment of the present invention.
Figure 1B:
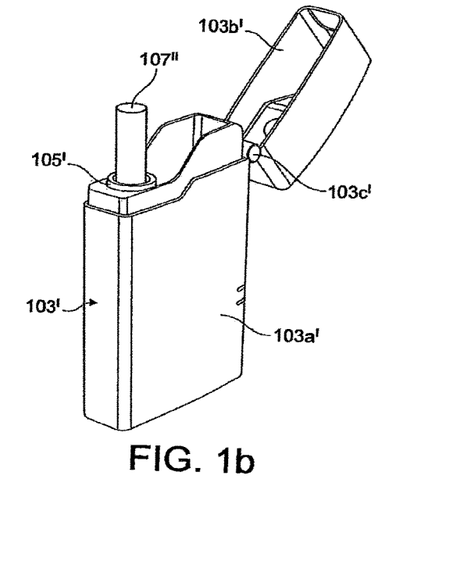

FIGS. 1a, 1b, 1c and 1d each show a version of a first embodiment of the invention. In FIGS. 1a and 1b, the primary unit is in the form of a flip-top box of a size and shape similar to a standard pack of lit-end cigarettes. Other pack configurations are discussed below with reference to FIG. 4a. Although not expressly shown, the primary unit may be another suitable size.

In FIG. 1a, smoking system 101 comprises primary unit 103 and secondary unit in the form of holder 105. The primary unit 103 has the form of a flip-top box, with a base portion 103a and a lid portion 103b, separated by a hinge 103c. The lid portion 103b is shown open in FIG. 1a. The hinge 103c runs along a long edge of the top side of the base portion 103a. The holder 105 can be stored in the base portion 103a of the primary unit 103 (as shown in FIG. 1a) by insertion into a docking port. In FIG. 1a, the docking port for holder 105 is provided at one side of the base portion 103a, but the docking port could equally be provided on the opposite side of the base portion 103a or in the centre of the base portion 103a. In the embodiment of FIG. 1a, when the holder 105 is stored in the primary unit 103, the top of the holder 105 protrudes above the top side of the base portion 103a. The lid portion 103b is, nonetheless, able to close onto the base portion 103a when the holder 105 is stored in the primary unit 103, including when a smoking article is contained in the holder 105. Alternatively, the top unit of the holder 105 may be virtually flush with the top side of the base portion 103a. The primary unit 103 also has storage for smoking articles 107, in this case to one side of the holder docking port. A further smoking article may, of course, be stored in the holder 105. Although not expressly shown, the docking port for holder 105 may be located on either side of the base portion 103a and the storage for smoking articles 107 may be located on the side opposite the holder 105. If the docking port for holder 105 is located towards the centre of the base portion 103a, storage for smoking articles 107 may be located on one or both sides of the docking port.

Additionally, in the base portion 103a of the primary unit 103 of FIG. 1a, there is an interface 109 for receiving a USB plug (not shown). The USB connection may be used for charging the power supply in the primary unit, for checking the functionality or for other purposes where connection to a computer is required. Such a USB interface, or indeed any other suitable interface, may be included on any of the described embodiments. Additionally or alternatively, a USB interface, or any other suitable interface, may be included on the holder, although this is not shown in FIG. 1a. The USB connection will be discussed further below.

In FIG. 1b, smoking system 101' comprises primary unit 103' and secondary unit in the form of holder 105'. As in FIG. 1a, the primary unit 103' has the form of a flip-top box, with a base portion 103a' and a lid portion 103b', separated by a hinge 103c'. However, in FIG. 1b, the hinge runs along a short edge of the top side of the base portion 103a'. The lid portion 103b' is shown open in FIG. 1b. The holder 105' can be stored in the base portion 103a' of the primary unit 103' (as shown in FIG. 1b) by insertion into a docking port. In FIG. 1b, the docking port for holder 105' is provided towards the front of the base portion 103a', that is, furthest from the hinge 103c', but the docking port could equally be provided towards the rear end of the base portion 103a', that is, closest to the hinge 103c', or in the centre of the base portion 103a'. In the embodiment of FIG. 1b, when holder 105' is stored in the primary unit 103', the top of the holder 105' may be virtually flush with the top side of the base portion 103a'. The lid portion 103b' is able to close onto the base portion 103a', including when a smoking article is contained in the holder 105'. Alternatively, the top of the holder 105' may protrude above the top side of the base portion 103a'. The primary unit 103' also has storage for smoking articles 107', in this case, towards the rear of the base portion 103a', that is, nearer to the hinge 103c'. A further smoking article may, of course, be stored in the holder. If the docking port 105' is located towards the rear of the base portion 103a', the storage for smoking articles 107' may be located at the end opposite the holder 105', that is towards the front of the base portion 103a'. If the docking port for holder 105' is located towards the centre of the base portion 103a', storage for smoking articles 107' may be located at one or both ends of the base portion 103a'.

Figure 1C:
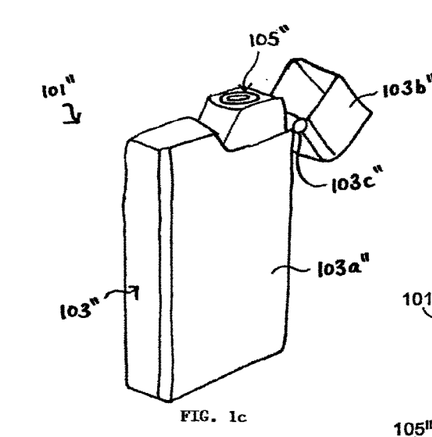

In FIG. 1c, smoking system 101" comprises primary unit 103" and secondary unit in the form of holder 105". The holder 105" can be stored in the primary unit 103" (as shown in FIG. 1c) by insertion into a docking port. The primary unit 103" comprises a base portion 103a" and a lid portion 103b", separated by a hinge 103c". As in FIG. 1b, the hinge runs along a short edge of the top side of the base portion 103a", although the hinge could run along a long edge of the top side of the base portion 103a". However, in FIG. 1c, the lid portion 103b", when closed, does not cover the entire top side of the base portion 103a". The lid portion 103b", when closed, only covers the portion of the base unit which contains the docking port for the holder 105". The lid portion 103b" is shown open in FIG. 1c. In the embodiment of FIG. 1c, when holder 105" is stored in the primary unit 103", the top of the holder 105" may be virtually flush with the top side of the base portion 103a". Alternatively, the top of the holder 105" may protrude above the top side of the base portion 103a". The lid portion 103b" may be able to close onto the base portion 103a" when the holder is stored in the docking port or when the holder is stored in the docking port and a smoking article (not shown in FIG. 1c) is contained in the holder 105". The primary unit 103" may also have storage for smoking articles, although this is not shown in FIG. 1c.

Figure 1D:
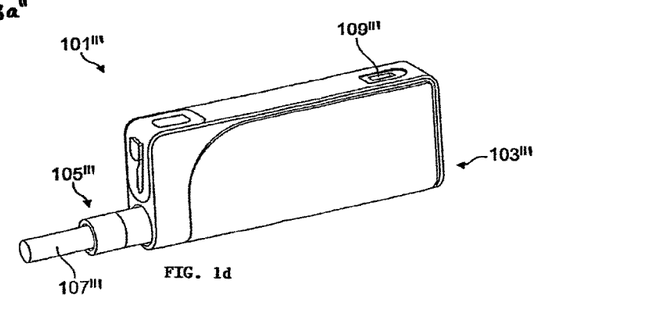

In FIG. 1d, smoking system 101''' comprises primary unit 103''' and secondary unit in the form of holder 105'''. The holder 105''' can be stored in the primary unit 103''' (as shown in FIG. 1d) by insertion into a docking port. In FIG. 1d, the docking port for holder 105''' is provided at one side of the base portion 103a''', but the docking port could equally be provided on the opposite side of the base portion 103a''' or in the centre of the base portion 103a'''. The primary unit 103''' and holder 105''' together form a single compact unit. In the embodiment of FIG. 1d, when the holder 105''' is stored in the primary unit 103''', the top of the holder 105''' protrudes above the top side of the primary unit 103'''. Alternatively, the top unit of the holder 105" may be virtually flush with the top side of the primary unit 103'''. In the embodiment of FIG. 1d, the primary unit 103''' does not have any storage for smoking articles, although a single smoking article may be stored in the holder 105'''. However, additional storage for smoking articles could be provided. Additionally, as in FIG. 1a, an interface 109''' is provided in the primary unit 103''' for receiving a USB plug (not shown).

In the embodiments shown in FIGS. 1a, 1b, 1c and 1d, the smoking system comprises a primary unit and one separate holder. The smoking system is designed for a single user. The holder may be stored in the primary unit. A smoking article may be received in the holder when the holder is stored in the primary unit or when the holder is separate from the primary unit. Additionally, the primary unit may provide storage for smoking articles. The storage for smoking articles may be sized to store between 1 and 20 smoking articles in any suitable configuration. The holder and primary unit together form a compact smoking system that can easily be carried by a user. The various features of FIGS. 1a, 1b, 1c and 1d are interchangeable.

Figure 2A:
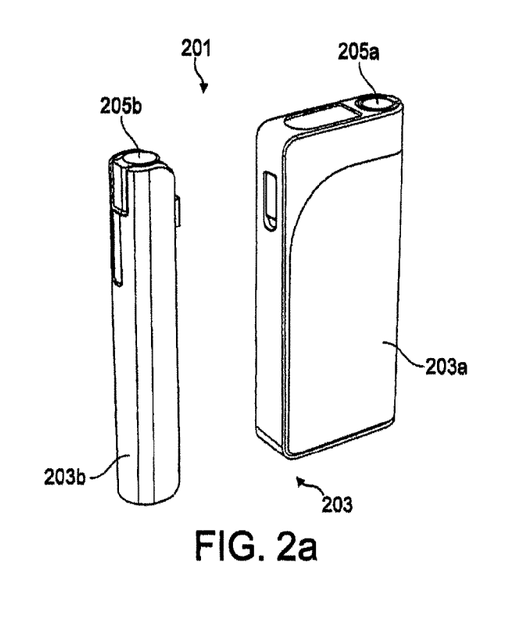
FIGS. 2a and 2b show two alternative views of a second embodiment of the present invention.
Figure 2B:
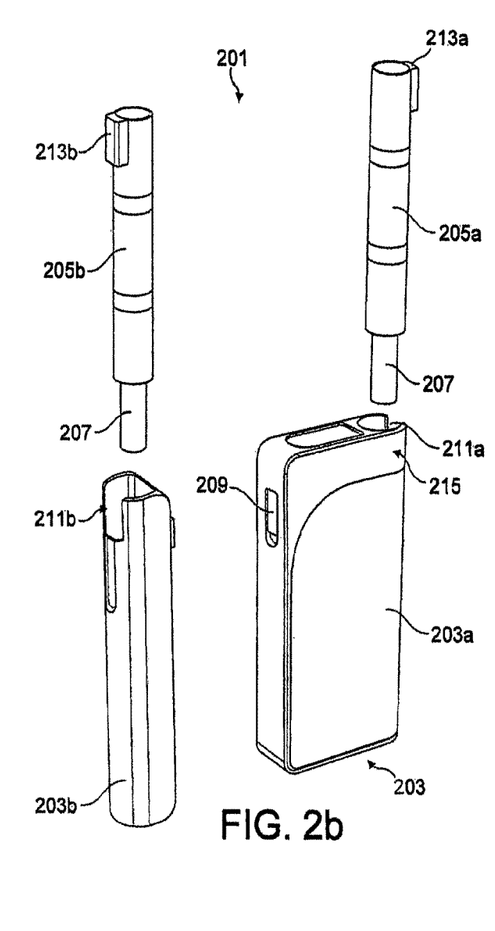

FIGS. 2a and 2b show alternative views of a second embodiment of the smoking system of the invention. In FIGS. 2a and 2b, smoking system 201 comprises primary unit 203 comprising a main part 203a and a separable docking port 203b, and two secondary units in the form of holders 205a and 205b. Each holder 205a, 205b may be received in the primary unit 203. In the embodiment of FIGS. 2a and 2b, first holder 205a may be received in a docking port which is integral with the main part 203a of the primary unit 203. Second holder 205b may be received in docking port 203b, which is separate from the main part 203a of the primary unit 203, but may be attached to one side of the main part 203a via interface 209. Alternative connections between the docking port 203b and the main part 203a of the primary unit 203 are, of course, possible. Docking port on main part 203a includes a recess 211a which is designed to cooperate with a protrusion 213a on holder 205a, for securing the holder 205a in the docking port 203. Similarly, holder 205b includes a protrusion 213b for cooperation with a recess 211b in the docking port 203b, which is separate from the main part 203a of the primary unit 203. In addition, a mechanism may be provided for securing a smoking article in the holder.

In FIG. 2a, the holders 205a and 205b are shown received in their respective docking ports, and docking port 203b is shown separate from the main part 203a of the primary unit 203. In FIG. 2b, the holders 205a and 205b are shown separately from their respective docking ports and in use with a smoking article 207.

In the embodiment shown in FIGS. 2a and 2b, the smoking system comprises a primary unit and two separate holders. The smoking system is designed to be shared by two users. Alternatively, the smoking system can be used by a single user, in which case one of the holders acts as a back-up. Holder 205a can be stored directly in main part 203a of the primary unit. Holder 205b can be stored in docking port 203b which is attachable to the main part 203a of the primary unit 203. The holders and primary unit together form a compact smoking system. A smoking article may be received in each holder when that holder is connected to the primary unit or when the holder is separate from the primary unit. Additionally, the primary unit may provide storage for smoking articles, although this is not shown in FIG. 2a or 2b.

Figure 3A:
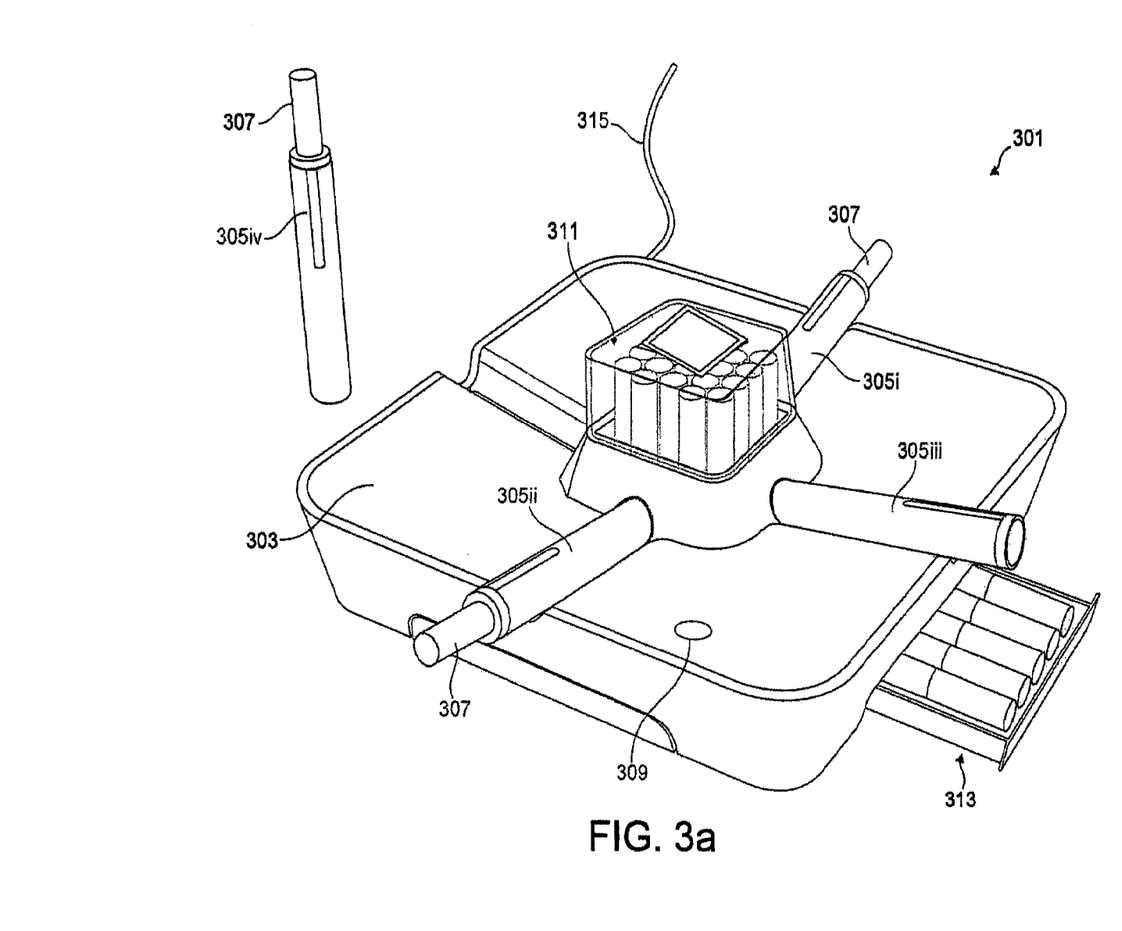
FIGS. 3a and 3b show two versions of a third embodiment of the present invention.
Figure 3B:
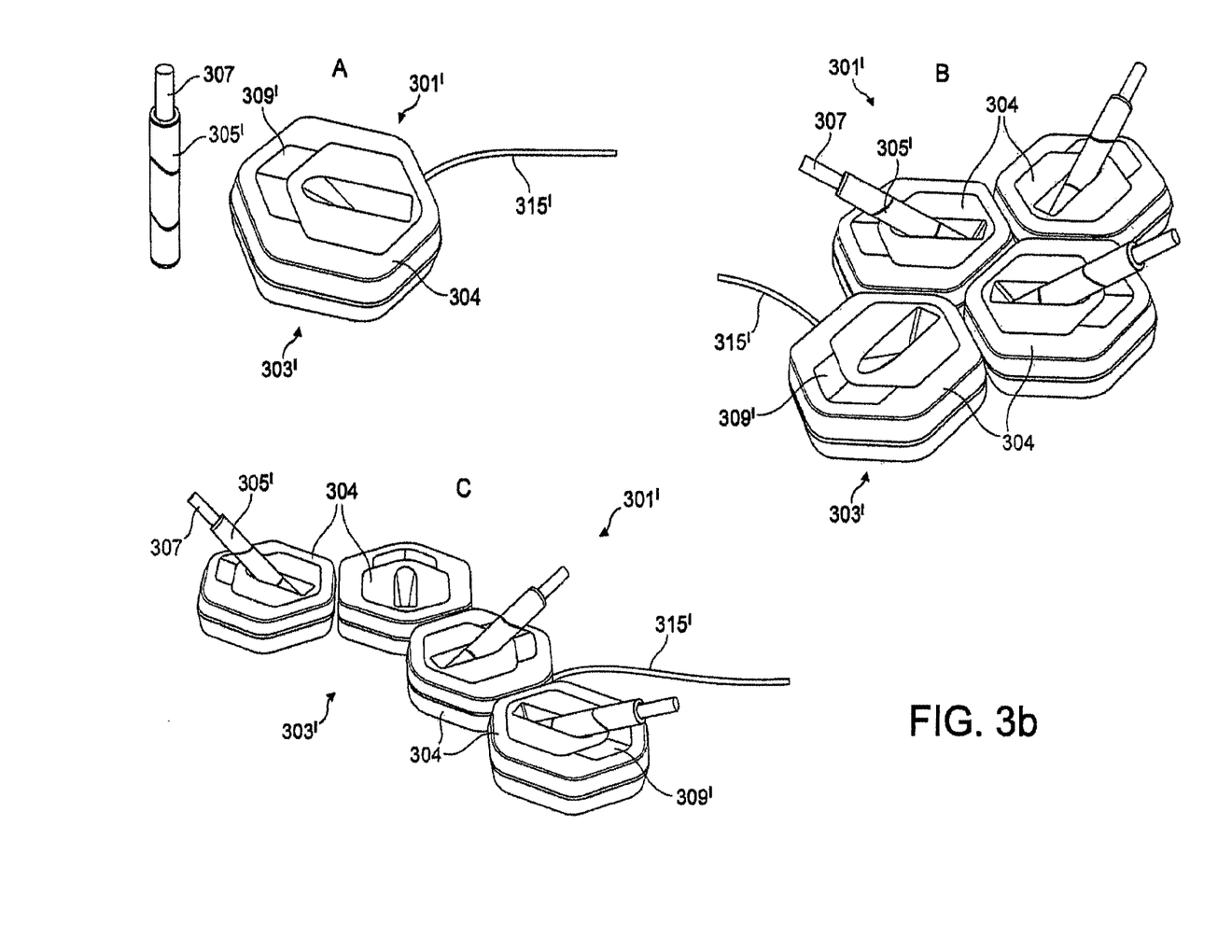

FIGS. 3a and 3b each show a version of a third embodiment of the invention. In FIG. 3a, smoking system 301 comprises primary unit 303 and a plurality of secondary units in the form of holders 305. In FIG. 3a, three holders 305i, 305ii and 305iii are shown connected to the primary unit 303 and one holder 305iv is shown separate from the primary unit 303. In FIG. 3a, the primary unit 303 provides docking ports for four holders 305, but any number of docking ports could be provided. For example, as many or 40 or 50 docking ports may be provided. In other embodiments, between 2 and 10 holders may be docked in primary unit 303 for charging. The primary unit 303 provides first storage 311 which may be used to store either smoking articles (used and unused) or holders, or both smoking articles and holders. The primary unit 303 also provides second storage 313 which may also be used to store either smoking articles or holders, or both smoking articles and holders.

In FIG. 3a, holders 305i and 305ii are shown docked in primary unit 303. They are each in use with a smoking article 307 and the power supply in the primary unit is being used for re-charging the power supply in the holder (charging mode). Holder 305iii is also shown docked in primary unit 303, but without a smoking article. The power supply in the holder 305iii is being recharged from the power supply in the primary unit 303 (charging mode). Holder 305iv is shown separate from the primary unit 303 and in use with a smoking article 307. The power supply in holder 305iv is being used to pre-heat the smoking article substrate (during the pre-heating mode) or maintain the operating temperature of the smoking article substrate (during the smoking mode).

In FIG. 3a, primary unit 303 is connected to an external power supply (not shown) via connection 315. The external power supply may be used for re-charging the power supply in the primary unit, for supplying power to the holders for charging the holders, or any combination of those.

In FIG. 3a, each docking port in primary unit 303 includes its own interface 309. This may include a display and a switch for initiating the pre-heating mode when a smoking article is received in the holder docked in the docking port.

In FIG. 3b, smoking system 301' comprises a modular primary unit 303' and a plurality of secondary units in the form of holders 305'. Several configurations are shown in FIG. 3b.

In the first configuration, A, the primary unit 303' comprises a single module 304. The module 304 provides a docking port for a single holder 305'. In the first configuration, A, the holder 305' is shown separate from the module 304 of the primary unit 303' and in use with a smoking article 307. The power supply in holder 305' is being used to pre-heat the smoking article substrate during the pre-heating mode or to maintain the operating temperature of the smoking article substrate during the smoking mode. The module 304 includes its own interface 309' for its docking port and may also include storage (not shown). The primary unit 303' is connected to an external power supply (not shown) via connection 315'.

In the second configuration, B, the primary unit 303' comprises four modules 304. Of course, any number of modules may be provided. Again, each module 304 provides a docking port for a single holder 305'. In the second configuration, the four modules are shown connected to one another in a "nest" formation. In the nest formation, each module may be connected to 1, 2, 3, 4, 5 or 6 other modules. The connection between modules 304 may be a magnetic connection or any other type of suitable connection. In the second configuration, B, three holders 305' with smoking articles 307 are shown docked in respective modules 304 and the primary unit 303' is being used for re-charging the power supply in each holder. As in configuration A, each module 304 includes its own interface 309' for its docking port and may also include storage (not shown). The primary unit 303' is connected to an external power supply (not shown) via connection 315'. Note that only a single power connection is required for the primary unit 303', which provides power to all the modules 304.

In the third configuration, C, the primary unit 303' comprises four modules 304. Of course, again, any number of modules may be provided. Again, each module 304 provides a docking port for a single holder 305'. In the third configuration, the four modules are shown connected to one another in a "chain" formation. In the chain formation, each module may be connected to only 1 or 2 other modules. The connection between modules 304 may be a magnetic connection or any other type of suitable connection. In the third configuration, C, three holders 305' with smoking articles 307 are shown docked in respective modules 304 and the primary unit 303' is being used for re-charging the power supply in each holder. As in configurations A and B, each module 304 includes its own interface 309' for its docking port and may also include storage (not shown). The primary unit 303' is connected to an external power supply (not shown) via connection 315'. Note that only a single power connection is required for the primary unit 303', which provides power to all the modules 304.

In the embodiment of FIG. 3b, each user may have their own holder 305' and module 304. As users join the group, new modules are added to the configuration. As users leave the group, modules are removed from the configuration.

In the embodiments shown in FIGS. 3a and 3b, the smoking system comprises at least one primary unit and a plurality of holders. The smoking system is designed to be used by many users. Unlike the embodiments of FIGS. 1 and 2, the smoking system shown in FIG. 3a may not necessarily be transportable, and may be permanently positioned in a location accessible to a plurality of users.

Each of the embodiments shown in FIGS. 1 to 3 includes at least one primary unit and one or more secondary units. However, a primary unit need not be included in the smoking system. In that case, the holder will be connectable directly to an external power source, such as a mains supply, or a host computer. This may be via a wired connection such as a USB connection. Connection to an in-vehicle charging port is also possible. In that case, the holder will include the necessary electronic circuitry to control the charging in the charging mode, and the heating of the smoking article substrate in the pre-heating mode. Various features common to all the illustrated embodiments will now be described.

The power supply in the primary unit may be any suitable power supply. The primary power supply may be chargeable by an external source. For example, the primary unit power supply may be a battery, such as a lithium ion, lithium iron phosphate, lithium manganese, nickel cadmium or nickel metal hydride battery. The external source may be an external computer connectable to the primary unit via a connection, for example a USB (Universal Serial Bus) connection. The external source may be mains electricity supply connectable to the primary unit via a plug and socket. The power capability of the primary unit's power source is preferably 3 to 6 Watts. The requirements that constrain the minimum size of the primary unit power supply are energy and charging time.

The electronic circuitry in the primary unit may include a microcontroller, a microprocessor, a digital signal processor (DSP), an application specific integrated circuit (ASIC) or any other programmable digital or analogue circuitry. The electronic circuitry in the primary unit has a number of functions including: to charge the primary unit power supply from an external source. The electronic circuitry may also be arranged to communicate with a host via a wired connection, for example USB, or via a wireless connection, for example Bluetooth to provide bi-directional transfer of data between the host and the primary and secondary units. The communication between the secondary unit and the primary unit may be facilitated when the secondary unit is in a docking port on the primary unit or when the secondary unit is stored in storage means in the primary unit.

As already mentioned, the primary unit may include an interface for external connection. Preferably, the interface operates under an interface standard. The connection may be a wired connection such as a USB link, or a wireless connection, such as Bluetooth. The wired connection may include a retractable cable. This may be used for charging the primary power supply. The connection may alternatively or additionally be used for extra functionality. For example, when the primary unit is connected to an external computer, the operation of the system may be checked and the user may be advised when maintenance is required, for example, when the primary or secondary unit power supply needs to be replaced. Additionally, the connection with a computer can allow the user to place an order for more smoking articles, download updates for any software, set personal consumption targets for individual users and share information. Further extended capabilities may be provided, not limited to those listed above. One or both of the primary and secondary units may include a digital display.

The power supply in the secondary unit provides enough energy to the heating elements to increase the temperature of the aerosol-forming substrate to an operating temperature and to maintain the aerosol-forming substrate of the smoking article at the operating temperature, for a predetermined period of time or predetermined number of puffs taken during the smoking mode. The power supply in the secondary unit may be a battery, a supercapacitor, a fuel cell or any other suitable power supply which can provide enough energy to maintain the substrate at working temperature for the predetermined period of time or for the predetermined number of puffs. In one embodiment, the secondary unit power supply comprises a plurality of lithium iron phosphate cells. In another embodiment, the secondary unit power supply comprises a lithium polymer battery. The predetermined period of time may be between 5 and 20 minutes. The predetermined number of puffs may be between 5 and 20 puffs. The power capability of the secondary unit's power source is preferably 1 to 3 Watts. The requirements that constrain the minimum size of the secondary unit power supply are energy provided per smoking experience, charging time and cycle life (that is, how often the power supply will need to be replaced).

As already mentioned, the secondary unit may include an interface for connection directly to an external source. Preferably, the interface operates under an interface standard. The connection may be a wired connection such as a USB link, or a wireless connection, such as Bluetooth. The wired connection may include a retractable cable. This may be used for charging the secondary power supply. The connection may alternatively or additionally be used for extra functionality. Preferably, the connection allows bi-directional flow of data. For example, when the secondary unit is connected to an external computer, the operation of the system may be checked and the user may be advised when maintenance is required, for example, when the secondary unit power supply needs to be replaced or the secondary unit needs to be cleaned. Further extended capabilities may be provided, not limited to those listed above.

The electronic circuitry in the secondary unit may include a microcontroller, a microprocessor, a digital signal processor (DSP), an application specific integrated circuit (ASIC) or any other programmable digital or analogue circuitry. The secondary unit electronic circuitry works in conjunction with the primary unit electronic circuitry. The pre-heating mode may be initiated when a smoking article is detected in the secondary unit. This may be detected by the secondary circuitry or primary circuitry if the secondary unit is in connection with the primary unit. Alternatively, a user may manually initiate the pre-heat, for example, by activating a switch on the secondary unit. During the smoking mode, the user may begin the smoking experience and continue the smoking experience puff by puff. The electronic circuitry in the secondary unit controls the heating elements to maintain the substrate at the operating temperature, or as close to the operating temperature as possible. The electronic circuitry in the secondary unit may be arranged to keep track of the number of puffs taken by the user, the amount of time between puffs and the amount of time that the heating elements have been energized. When either the number of puffs reaches the maximum number for the smoking article (so that the smoking article is depleted), the user has not taken a puff before the predetermined time, or the predetermined period of time has expired, but there are puffs remaining, a signal from the electronic circuitry notifies the user to return the secondary unit to the primary unit. Then, if appropriate, the power supply in the secondary unit can be recharged and the substrate returned to operating temperature. In this way, the user is able to stop and start the smoking experience, and restart the smoking experience until the smoking article is depleted.

In addition, the electronic circuitry may identify the smoking article in the secondary unit, adjust the heating profile based on the smoking article type and determine when the holder needs maintenance, for example when the heating elements need to be cleaned. The electronic circuitry in the secondary unit can also allow the secondary unit to be personalized for an individual's smoking behaviour. For example, duration of the smoking experience, time of each puff, time between puffs and intensity of each puff, may be recorded, the individual's consumption patterns may be tracked and the individual's preferred smoking article may be monitored. This may work in conjunction with a lock on the secondary unit, which allows only a particular user to use the secondary unit.

In order for the electronic circuitry in the secondary unit to count the number of puffs taken, the electronic circuitry may include a puff sensor for sensing air flow indicative of a puff. The sensor may be any suitable type of sensor, for example a thermistor, an optical device, an opto-mechanical device, an electro-mechanical device, or a micro electro mechanical systems (MEMS) device.

The shape and size of the secondary unit will, to a certain extent, depend on the size and shape of the secondary unit power supply. In principle, however, the secondary unit may be any suitable shape. Typically, the secondary unit is an elongate cylindrical unit having a size only slightly larger than the smoking article. The cross sectional shape of the secondary unit may be round, rectangular, or oval. The secondary unit may include a cap for covering the smoking article when it is received in the secondary unit, for protection of the smoking article or for limiting odour. The secondary unit may include a cap for covering the open end of the secondary unit. Typically, when the smoking article is received in the secondary unit, approximately half the length of the smoking article protrudes from the secondary unit. In other embodiments, less than half of the length of the smoking article protrudes from the secondary unit.

The heating element or elements in the secondary unit may be internal or external heating elements and are shaped to most effectively heat the aerosol-forming substrate. There may be a single heating element or multiple heating elements. The heating elements may be made from an electrically resistive material including, but not limited to, a metal, a metal alloy, a ceramic or a semiconductor material. The most appropriate form for the heating element or elements will depend on the particular aerosol-forming substrate in the smoking article. The aerosol-forming substrate is preferably a solid substrate but may, alternatively, be a liquid or gas substrate.

Preferably, the secondary unit is insulated to minimise heat loss during the smoking mode. The better insulated the secondary unit, the longer the substrate can remain at operating temperature, which can extend the predetermined period of time for the smoking mode.

Figure 4A:
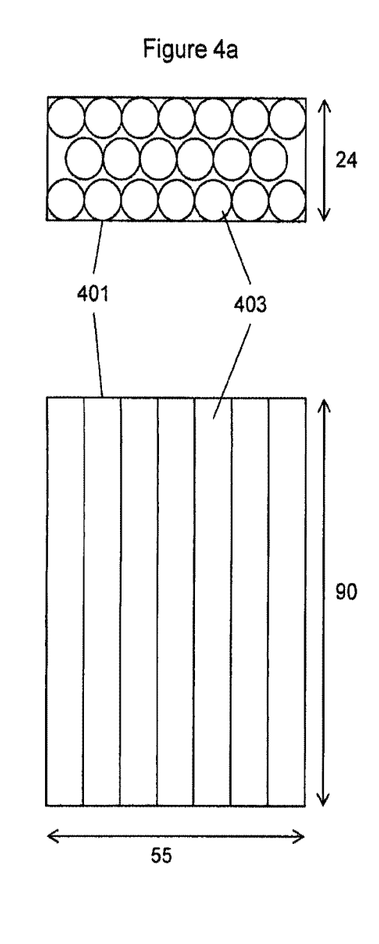
FIGS. 4a, 4b and 4c show two embodiments of the smoking system of the present invention in comparison with a pack of lit-end cigarettes.
Figure 4B:
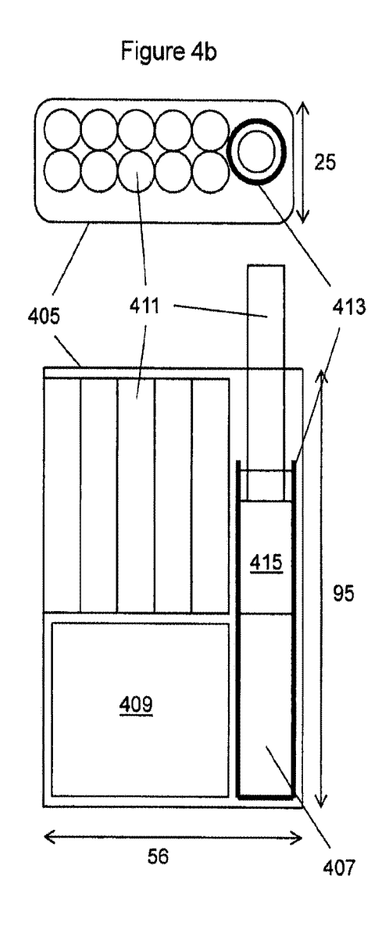
Figure 4C:
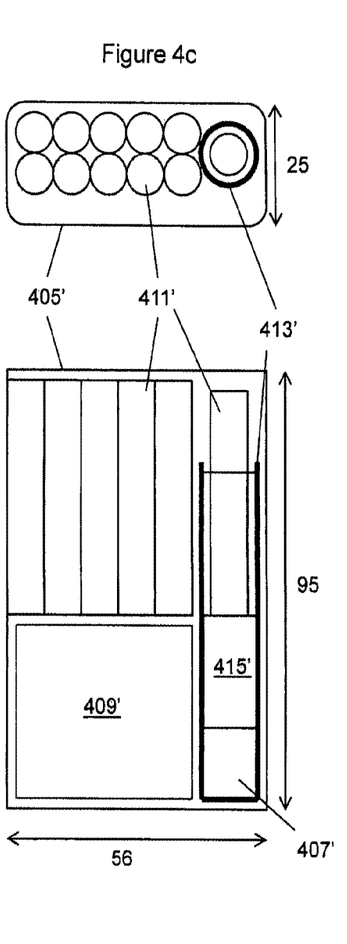

FIG. 4a shows a pack of lit-end cigarettes. FIG. 4b shows one embodiment of the smoking system of the present invention, in which the secondary unit in the form of the holder may be stored in the primary unit. FIG. 4c shows one embodiment of the smoking system of the present invention, in which the holder may be stored in the primary unit, even when a smoking article is received in the holder. FIGS. 4a, 4b and 4c are provided to show the relative sizes of embodiments of the smoking system of the present invention and a pack of lit-end cigarettes.

FIG. 4a shows a pack 401 for lit-end cigarettes 403. The lower view in FIG. 4a is a cross sectional side view. The upper view in FIG. 4a is a cross sectional top view. This pack has a width of 55 mm, a height of 90 mm and a depth of 24 mm. FIG. 4a shows one example of a pack of lit-end cigarettes. Generally, packs of lit-end cigarettes have a height of between about 60 mm and about 150 mm, more typically a height of between about 70 mm and about 125 mm. Generally, packs of lit-end cigarettes have a width of between about 12 mm and about 150 mm, more preferably a width of between about 70 mm and about 125 mm. Generally, packs of lit-end cigarettes have a depth of between about 6 mm and about 100 mm, more preferably a depth of between about 12 mm and about 25 mm. Preferably, the dimensions of the packs are adapted to the length of the cigarettes, and the collation of the cigarettes.

Packs of lit-end cigarettes may be in the shape of a rectangular parallelepiped, with right-angled longitudinal and right-angled transverse edges. Alternatively, the pack may comprise one or more rounded longitudinal edges, rounded transverse edges, bevelled longitudinal edges or bevelled transverse edges, or combinations thereof. Alternatively, the pack may have a non-rectangular transversal cross section, for example polygonal such as triangular or hexagonal, or oval, semi-oval, circular or semi-circular. The packs may be used to package smoking articles including, but not limited to, conventional lit-end cigarettes, cigars or cigarillos, heated smoking articles comprising a combustible fuel element or heat source and an aerosol-generating substrate (for example cigarettes of the type disclosed in U.S. Pat. No. 4,714,082) and smoking articles for use with electrical smoking systems (for example cigarettes of the type disclosed in U.S. Pat. No. 5,692,525).

Through an appropriate choice of the dimensions thereof, packs may be designed to hold different total numbers of smoking articles, or different arrangements of smoking articles. Packs may hold smoking articles of the same type or brand, or of different types or brands. In addition, both filterless smoking articles and smoking articles with various filter tips may be contained, as well as smoking articles of differing length and diameter. In addition, the smoking articles may differ in strength of taste, resistance to draw and total particulate matter delivery. The pack may comprise more than one of the different types of smoking articles listed above.

FIG. 4b shows a first embodiment of a smoking system according to the invention. The lower view in FIG. 4b is a cross sectional side view. The upper view in FIG. 4b is a cross sectional top view. The system comprises a primary unit 405 and a holder 407. The primary unit includes a primary power supply in the form of battery 409, storage for smoking articles 411, and a docking port 413 for receiving the holder. The holder includes heating elements, indicated schematically at 415. In this embodiment, when the holder is stored in the docking port of the primary unit, the lid portion (not shown) can be closed. However, when the holder is stored in the docking port of the primary unit with a smoking article is received in the holder (as shown in FIG. 4b), the lid portion cannot be closed. The smoking system has a width of 56 mm, a height of 95 mm and a depth of 25 mm.

FIG. 4c shows a second embodiment of a smoking system according to the invention. The lower view in FIG. 4c is a cross sectional side view. The upper view in FIG. 4c is a cross sectional top view. The system comprises a primary unit 405' and a holder 407'. The primary unit includes a battery 409', storage for smoking articles 411', and a docking port 413' for receiving the holder. The holder 407' includes heating elements, indicated schematically at 415'. In this embodiment, when the holder is stored in the docking port of the primary unit, even with a smoking article received in the holder (as shown in FIG. 4c), the lid portion (not shown) can be closed. This is because the holder 407' has a different construction from holder 407, in particular the heating elements are positioned differently. The smoking system has a width of 56 mm, a height of 95 mm and a depth of 25 mm.

It can be seen from FIGS. 4a, 4b and 4c that at least two embodiments of the smoking system of the present invention are of a similar size and shape as a pack of lit-end cigarettes. Other embodiments of the smoking system may be of a similar size and shape to other pack sizes and shapes, as described above. All the components required for the smoking experience are contained in the single compact unit.

Figure 5:
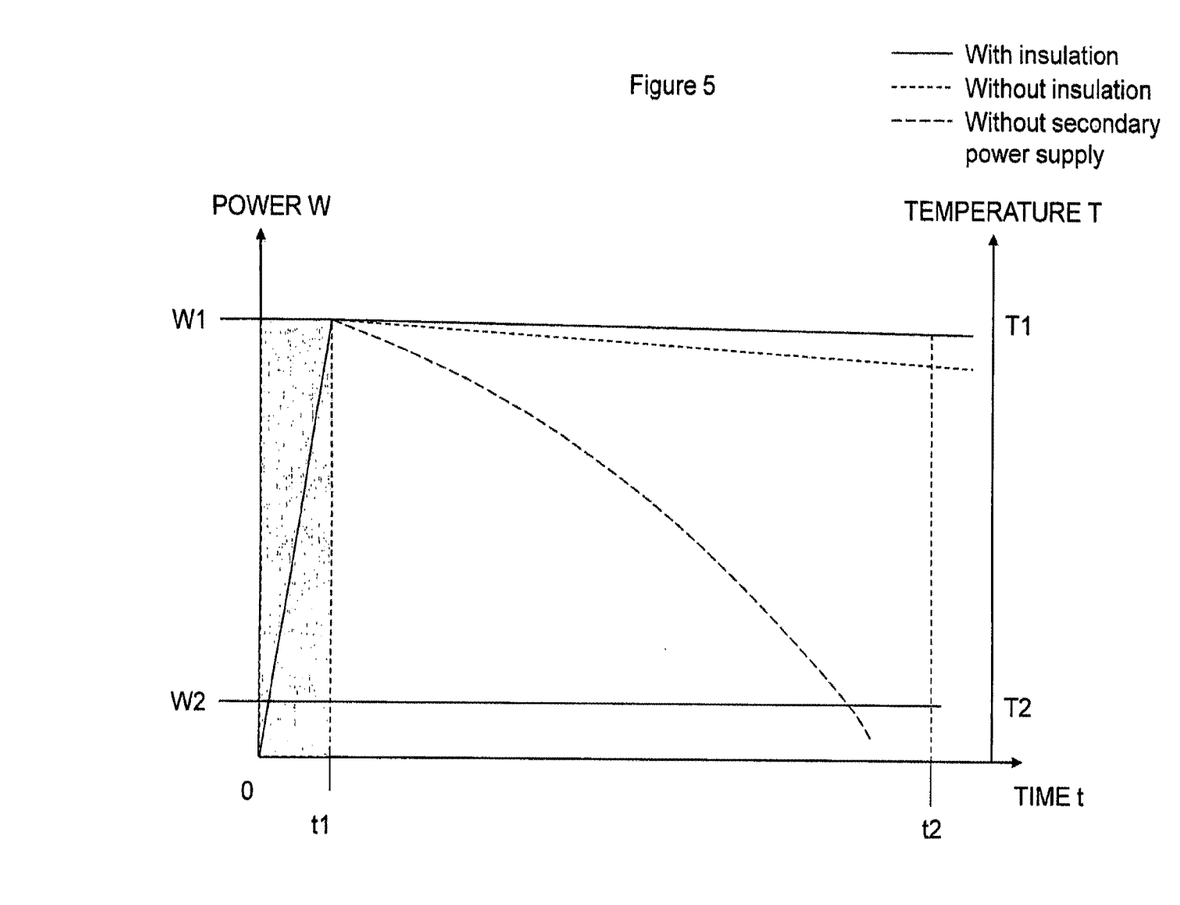
FIG. 5 shows a graph of power versus time during operation of the smoking system according to a preferred embodiment.

Operation of the electrically heated smoking system according to an embodiment of the present invention will now be described with reference to FIG. 5. FIG. 5 is a graph of power used W and temperature T versus time t for the pre-heating and smoking modes.

First, the user inserts a smoking article into the secondary unit. At this time, the secondary unit can be connected to, or separate from, the primary unit.

Second, the secondary unit is connected to the primary unit (if not already connected) (or an alternative source of power) and the primary power supply in the primary unit begins to charge the secondary power supply in the secondary unit. The charging time will depend on the details of the smoking system, but is not more than approximately 5 minutes in a preferred embodiment. The order of the first two steps may be reversed. For example, the secondary unit may be stored in or on the primary unit when not in use, so that the secondary power supply is fully charged and the secondary unit is ready for a user to initiate the smoking experience at any time. In that case, the secondary power supply in the secondary unit is charged before a smoking article is inserted into the portable secondary unit.

Third, once the secondary power supply is fully charged (this can be indicated by a signal on the primary or secondary unit), the user may begin the pre-heating mode. At this stage, the user may remove the portable secondary unit from the primary unit or the secondary unit may remain connected to the primary unit. Additionally, the pre-heating mode may be initiated prior to or at the same time that the charging mode begins. The pre-heating mode may be started by the user pressing a button or flipping a switch when he or she is ready to begin the smoking experience. Alternatively, the user may begin the pre-heating mode by shaking the unit a predetermined number of times to begin the pre-heat phase. At the beginning of the pre-heating mode, at time 0 in the graph of FIG. 5, the secondary power supply is then connected to the heating elements in the secondary unit, under control of the electronic circuitry in the secondary unit and, optionally, the primary unit. The heating elements are energized until the substrate in the smoking article reaches the desired operating temperature T1 (e.g., between approximately 150 and 250° C.). During the pre-heating mode (shown by the shaded box in FIG. 5), the temperature of the substrate is raised rapidly, but in a controlled manner in order to avoid overshoot. In one embodiment, a temperature sensor is located in the secondary unit. The primary unit may also include a temperature sensor. In another embodiment, the primary unit or the secondary unit may detect that the substrate has reached the desired operating temperature T1 after an energizing period t1 has elapsed. The energizing period may be between approximately 10 seconds and approximately 150 seconds. At the end of this pre-heating period, t1 in FIG. 5, electronic circuitry in the secondary unit may generate a signal to indicate that the pre-heating period mode is complete and that the user can begin the smoking experience.

Fourth, the user may now remove the portable secondary unit (with the received smoking article) from the primary unit, if not already removed, to begin the smoking mode. This is at time t1 in the graph of FIG. 5. During the smoking mode, the secondary power supply in the secondary unit, is used to maintain the substrate at or close to operating temperature T1. The heating elements provide enough heat to the substrate to maintain the substrate at operating temperature, thereby compensating for heat losses through the secondary unit, and as air is drawn through the secondary unit during each puff. The electronic circuitry in the secondary unit records the time elapsed, the time between puffs and/or the number of puffs taken, since the portable secondary unit was removed from the primary unit at time t1.

In FIG. 5, three plots are shown during the smoking mode. The first, solid line indicates the temperature when the secondary unit is insulated. This is the preferred embodiment and, as can be seen from FIG. 5, maintains the substrate very close to the operating temperature T1 and power W1. The second, dotted line indicates the temperature when the secondary unit is not insulated. In that embodiment, the substrate is still maintained close to the operating temperature T1 but there is more heat loss than when the secondary unit is insulated. The third, dashed line indicates the temperature without any secondary power supply in the secondary unit. In that arrangement, the temperature of the substrate falls away quickly during the smoking mode.

Fifth, the electronic circuitry in the secondary unit either detects that the maximum number of puffs (e.g., between approximately 5 and 20 puffs per smoking article) has been reached, or the maximum amount of time for the smoking mode (e.g., approximately 5 to 20 minutes after the user has removed the holder from the primary unit) has expired, or the maximum amount of time between puffs (e.g., approximately 30 sec to 5 minutes) has expired. This is time t2 in the graph of FIG. 5. In the first case, if the electronic circuitry in the secondary unit detects that the maximum puff count has been reached for the smoking article, the electronic circuitry will stop energizing the heating elements to maintain the substrate at the desired operating temperature. If the maximum number of puffs have been taken by the user during the smoking mode, the electronic circuitry in the secondary unit generates a signal to the user indicating that the maximum number of puffs have been taken. This signal may be in the form of a display on the portable secondary unit (for example indicating the number of puffs remaining), one or more indicator lights, such as LEDs, which switch on or off as the puffs are taken, an audible notification such as a buzzer, a silent notification such as a vibration, or any other suitable signal. In the second case, if the electronic circuitry in the secondary unit detects that the maximum amount of time for the smoking mode has expired, the electronic circuitry will stop maintaining the operating temperature at the substrate and will generate a signal to the user indicating that time for the smoking mode has expired. This signal can be any suitable signal as described above. In the third case, if the maximum amount of time allowed for the user to take consecutive puffs has expired, the electronic circuitry generates a signal to the user indicating that a puff has not been taken during the allowed time. This signal can be any suitable signal as described above. The signals can indicate that the secondary unit should be returned to the primary unit for charging.

Sixth and finally, the user may reconnect the portable secondary unit and the primary power supply and the primary unit begins to recharge the secondary power supply in the portable secondary unit again. Once the secondary power supply in the secondary unit is fully charged, if puffs remain, the user can restart the smoking experience from the third step. Thus, the user can start and stop the smoking experience.

Figure 6:
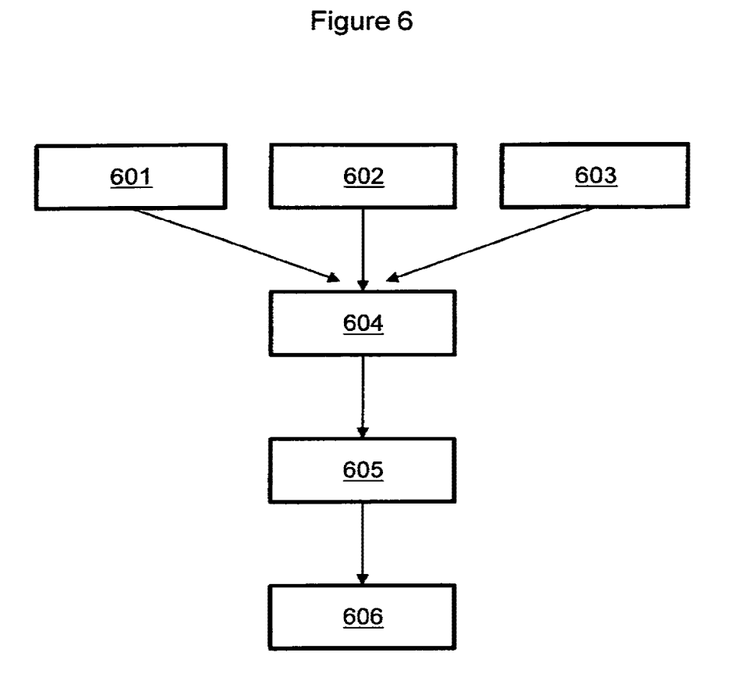
FIG. 6 shows a flow diagram illustrating an embodiment of the method of the present invention.

As described, embodiments of the invention provide a number of advantages. First, by dividing the system, in particular the power supply, into two portions, the size of the secondary unit can be reduced. Second, the secondary unit can facilitate puff on demand, and the smoking experience can be started and stopped. Embodiments for a single user, which have a size and shape similar to that of a pack of lit-end cigarettes, are advantageous since there will need to be minimal disruption to the user's smoking behaviour for the user to adopt the product. In addition, the user need only carry the single unit which provides all the components required for the smoking experience. Embodiments which provide a plurality of secondary units for use by a plurality of users are advantageous since they facilitate social interaction. Embodiments in which the secondary unit is personalised allow the user to prevent unauthorised use and the performance may be adapted to best suit the user. FIG. 6 shows a flow diagram illustrating an embodiment of the method of the present invention. FIG. 6 shows an embodiment of the method for charging the secondary power supply in the charging mode. During the charging mode, the secondary unit must be connected to the primary unit (or primary power supply if there is no primary unit). The charging of the secondary power supply is controlled by the secondary circuitry in the secondary unit.

In the embodiment of FIG. 6, the determination of when the secondary power supply is sufficiently charged is based on a calculated estimate of the electrical power required for operating the secondary unit in both the pre-heating mode and the smoking mode. In the embodiment of FIG. 6, this calculation is based on three technical parameters 601, 602, 603. The first technical parameter 601 is a pre-specified number of puffs to be taken by a user during the smoking mode. That pre-specified number of puffs is preferably close to the number of puffs for a lit-end smoking article. For example, the pre-specified number of puffs may be between 10 puffs and 20 puffs, even more preferably 15 puffs.

The second technical parameter 602 is the electrical power required for the pre-heating mode. This may depend on the physical properties of the smoking article and the aerosol-forming substrate, for example, but not limited to, the density or structure of the aerosol-forming substrate. This may also depend on the energizing period to reach the desired operating temperature. The value of the second technical parameter 602 may be determined empirically, for example, by laboratory test runs using different substrates.

The third technical parameter 603 is consumer-specific information relating to the smoking mode, for example, but not limited to the puff strength and puff length. Such consumer-specific information affects the electrical power required for operating the secondary unit during one puff in the smoking mode.

Typically, the first and second technical parameters 601, 602 are required for the calculated estimate of when the secondary power supply is sufficiently charged. Typically, the third technical parameter 603 is preferred, but not required. One of the advantages of the secondary circuitry controlling supply of power during the charging mode is that the secondary circuitry may have gathered consumer-specific information. Therefore, the consumer-specific information does not need to be transferred to the primary circuitry.

At step 604, the required electrical power for both the pre-heating mode and the smoking mode is calculated based on the values of the three technical parameters 601, 602, 603. This calculation 603 may be based on an integration calculation or sum of the values for each technical parameter. Preferably, the calculation is performed by the secondary circuitry, in which case, the determined value of the required electrical power must be communicated to the primary unit, at step 605, since the secondary power supply is being re-charged from the primary power supply. This required electrical power may be considered a minimum electrical power.

Once it is determined that the secondary power supply has sufficient charge to increase the temperature of the aerosol-forming substrate to the operating temperature in the pre-heating mode and to maintain the temperature of the aerosol-forming substrate at substantially the operating temperature during the smoking mode, this may be signalled to the user, at step 606. For example, the primary unit or secondary unit may indicate that the secondary unit has sufficient charge. This may be by way of an LED light or an LCD display, for example.

The invention claimed is:

1. An electrically heated smoking system comprising a secondary unit configured to receive a smoking article having an aerosol-forming substrate, the secondary unit comprising:
   at least one heating element;
   an interface configured to connect to a primary power supply;
   a secondary power supply configured to supply electrical power to the at least one heating element; and
   secondary circuitry configured to:
   control supply of electrical power from the secondary power supply to the at least one heating element in a pre-heating mode, during which a temperature of the aerosol-forming substrate is increased to an operating temperature,
   control the supply of electrical power from the secondary power supply to the at least one heating element in a smoking mode, during which a temperature of the aerosol-forming substrate is maintained at substantially the operating temperature, and
   control charging of the secondary power supply by the primary power supply, in a charging mode, so that the secondary power supply has sufficient charge to increase a temperature of the aerosol-forming substrate to the operating temperature in the pre-heating mode and to maintain the temperature of the aerosol-forming substrate at substantially the operating temperature during the smoking mode.

2. The electrically heated smoking system according to claim 1, wherein the secondary circuitry is further configured to determine whether the secondary power supply has sufficient charge to increase the temperature of the aerosol-forming substrate to the operating temperature in the pre-heating mode and to maintain the temperature of the aerosol-forming substrate at substantially the operating temperature during the smoking mode, based on a calculation of an estimate of electrical power required for both the pre-heating mode and the smoking mode.

3. The electrically heated smoking system according to claim 2, wherein the calculation is based on one or more of: a pre-specified number of puffs to be taken by a user during the smoking mode; the electrical power required for the pre-heating mode; and consumer-specific information relating to the smoking mode.

4. The electrically heated smoking system according to claim 1, wherein the interface is further configured to provide bi-directional communication between the secondary unit and an intelligent device.

5. The electrically heated smoking system according to claim 1, further comprising a primary unit comprising the primary power supply and primary circuitry.

6. The electrically heated smoking system according to claim 5, wherein the primary unit further comprises an interface configured to connect to an external power supply for supplying electrical power to the primary power supply.

7. The electrically heated smoking system according to claim 5, further comprising a plurality of secondary units.

8. The electrically heated smoking system according to claim 7, wherein the primary unit includes a plurality of connectable modules, each module including a docking port for a respective secondary unit of the plurality of secondary units.

9. The electrically heated smoking system according to claim 5, wherein the primary unit includes storage means for one or more secondary units.

10. The electrically heated smoking system according to claim 5, wherein the primary unit includes storage means for at least one smoking article.

11. The electrically heated smoking system according to claim 1, wherein the secondary unit is insulated.

\* \* \* \* \*